United States Patent
Dong

(12) 
(10) Patent No.: US 6,630,895 B1
(45) Date of Patent: Oct. 7, 2003

(54) COMPUTER KEYBOARD WITH BUILT-IN DISPLAY

(75) Inventor: Vinson Dong, Sanchong (TW)

(73) Assignee: Behavior Tech Computer Corporation, Taipei (TW)

(*) Notice: Subject to any disclaimer, the term of this patent is extended or adjusted under 35 U.S.C. 154(b) by 425 days.

(21) Appl. No.: 09/686,866

(22) Filed: Oct. 12, 2000

(51) Int. Cl.⁷ .................. H03K 17/94; H03M 11/00
(52) U.S. Cl. ................. 341/22; 345/168; 400/703
(58) Field of Search .................. 341/22; 400/472, 400/703; 345/168

(56) References Cited

U.S. PATENT DOCUMENTS 4,445,871 A * 5/1984 Becker .................. 400/472
6,312,175 B1 * 11/2001 Lum ...................... 400/472
2001/0022914 A1 * 9/2001 Iura et al. ................ 400/472

* cited by examiner

*Primary Examiner*—Timothy Edwards

(57) ABSTRACT

A keyboard assembly includes a wireless USB (Universal Serial Bus) based keyboard having an upper face on which push buttons are movably mounted. A recess is defined in the upper face of the keyboard. A display is sized to be received in the recess. The display may be fixed in the recess. Alternately, the display is pivoted to the keyboard and movable between an erected position for user's observation and a stowed position where the display is received in the recess. The keyboard and the display are controlled by a common USB interface control circuit thereby enabling the keyboard to receive and display video signals without additional circuit.

8 Claims, 4 Drawing Sheets

COMPUTER KEYBOARD WITH BUILT-IN DISPLAY

FIELD OF THE INVENTION

The present invention generally relates to a computer keyboard, and in particular to a computer keyboard assembly having a built-in display.

BACKGROUND OF THE INVENTION

A keyboard is an important input device for a computer system. A user may enter command, key in data or control the computer system via a keyboard. Furthermore, by cooperating with other peripheral devices, a keyboard may also allows user's control and execution of different application software.

An interface circuit is required between a peripheral device, such as a keyboard, and a computer for conversion of signals and data therebetween. An example of the interface is an RS-232 interface. The RS-232 interface has a limited capability and is gradually replaced by a more versatile interface called USB (Universal Serial Bus) interface which allows wireless communication between a computer and its peripheral devices with a higher rate of transmission.

The trend of multi-media requires enhanced audio and video input/output. To suit the trend, a computer keyboard is sometimes integrated with audio-related control buttons or audio input/output devices. However, heretofore, video-related functions have not been integrated with a computer keyboard yet.

It is thus desirable to provide a computer keyboard in which video-related functions may be integrated.

SUMMARY OF THE INVENTION

Accordingly, an object of the present invention is to provide a computer keyboard having a display built therein for enhancing the functions of the keyboard.

Another object of the present invention is to provide a wireless USB-based computer keyboard having a built-in display in which a single control chip is adapted to control both the keyboard and the display so as to enhance the operation and control of the keyboard.

To achieve the above objects, in accordance with the present invention, there is provided a keyboard assembly comprising a wireless USB-based keyboard having an upper face on which push buttons are movably mounted. A recess is defined in the upper face of the keyboard. A display is sized to be received in the recess. The display may be fixed in the recess. Alternately, the display is pivoted to the keyboard and movable between an erected position for user's observation and a stowed position where the display is received in the recess. The keyboard and the display are controlled by a common USB interface control circuit thereby enabling the keyboard to receive and display video signals without additional circuit.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
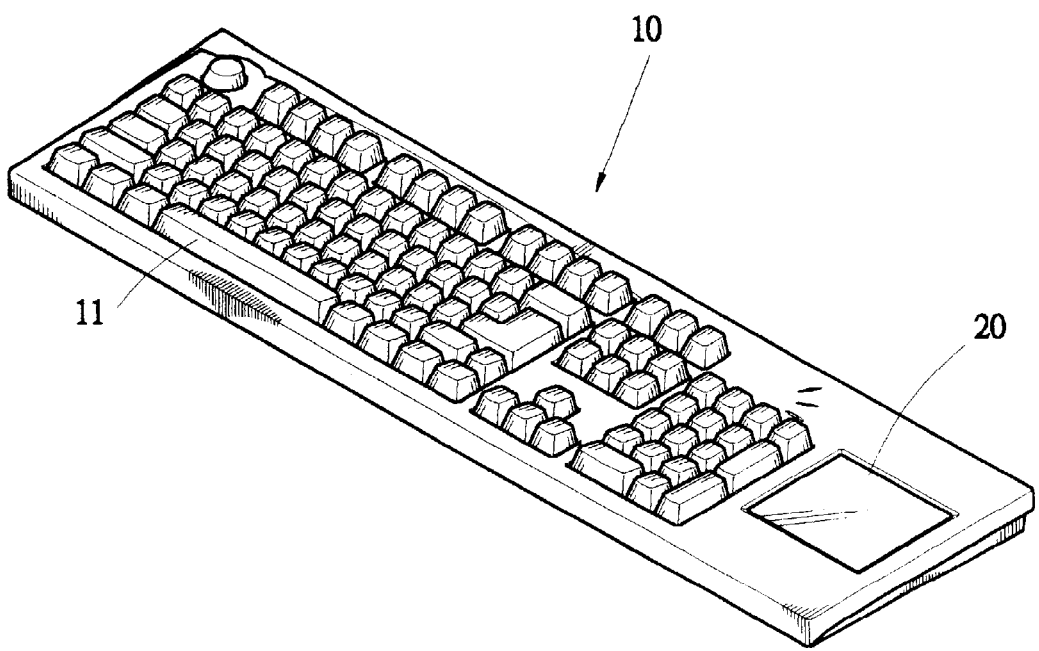
FIG. 1 is a perspective view showing a computer keyboard constructed in accordance with a first embodiment of the present invention.

With reference to the drawings and in particular to FIG. 1, a computer keyboard with built-in display in accordance with the present invention comprises a conventional computer keyboard 10 which in the embodiment illustrated is a wireless USB (Universal Serial Bus) based keyboard and a display 20 mounted on the keyboard 10.

The USB keyboard 10 comprises a casing (not labeled) having an upper face on which push buttons 11 are movably mounted. The USB keyboard 10 further comprises a USB interface control chip (not shown) fixed in the casing. The display 20 is connected to and controlled by the same control chip whereby the functions of keyboard control and video signal transmission/receiving are both performed by the same control chip. Thus, video-related functions may be integrated in the keyboard 10.

The display 20 is mounted on an area of the upper face of the keyboard 10 in which no push buttons are arranged. In the embodiment illustrated in FIG. 1, the display 20 is arranged to be substantially parallel and preferably flush with the upper face of the keyboard casing. For example, a recess (not shown in FIG. 1) is formed in the upper face and the display 20 is completely received in the recess.

Figure 2:
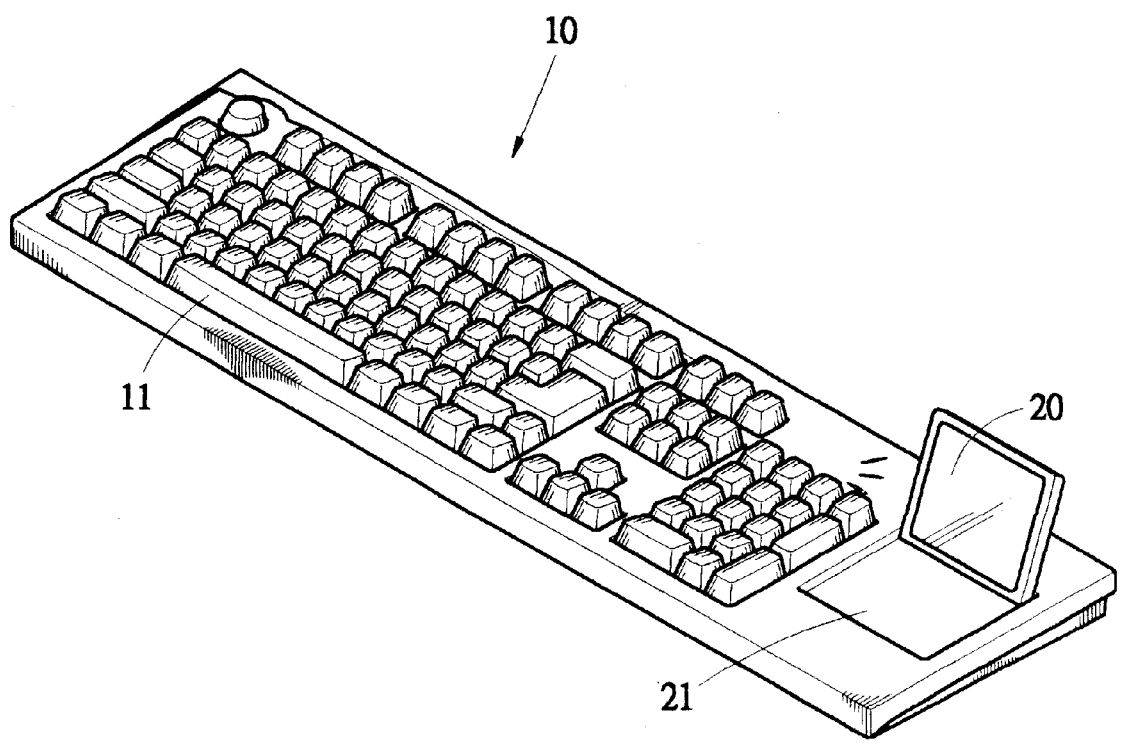
FIG. 2 is a perspective view showing a computer keyboard constructed in accordance with a second embodiment of the present invention.

However, it is apparent to those having ordinary skills to arrange the display 20 to be inclined with respect to the upper face of the keyboard 10. FIG. 2 shows a second embodiment of the present invention in which the display 20 is inclined with respect to the upper face of the keyboard 10. A recess 21 is defined in the upper face of the keyboard for accommodating the display 20. An edge of the display 20 is received in the recess 21 and pivoted to the keyboard 10 whereby the display 20 is rotatable about the pivot between an erected position where the display 20 is exposed for user's observation and a stowed position where the display 20 is received in the recess 21 and faces downward for protection of the display screen. Preferably, a frictional engagement or other suitable means is formed between the display 20 and the recess 21 for selectively retaining the display 20 at any desired angle with respect to the keyboard 10.

Figure 3:
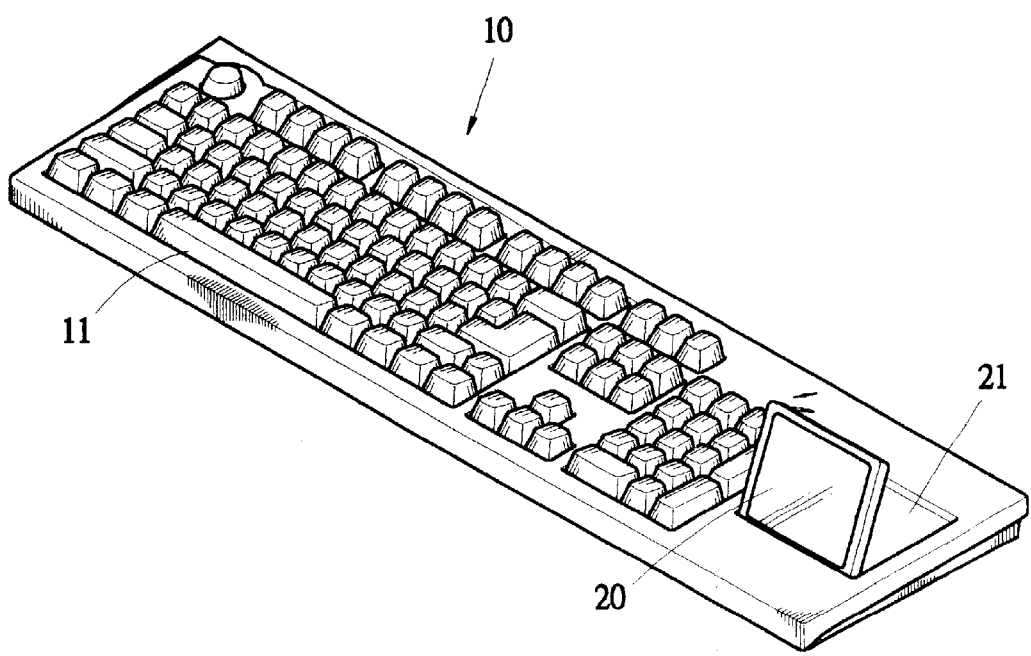
FIG. 3 is a perspective view showing a computer keyboard constructed in accordance with a third embodiment of the present invention.
Figure 4:
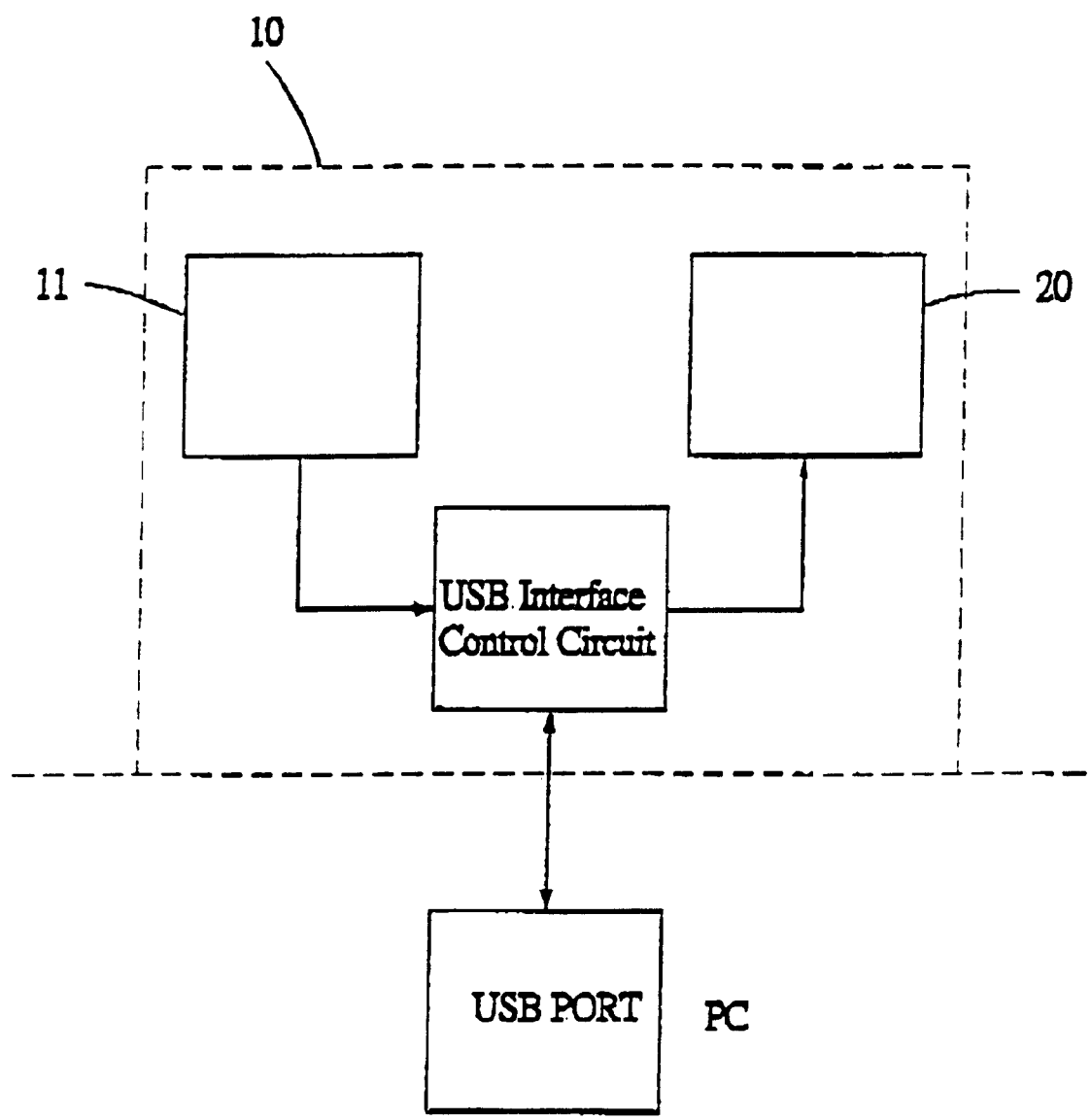
FIG. 4 is a schematic block diagram illustrating a functional interconnection of certain portions of a computer keyboard configured in accordance with an exemplary embodiment of the present invention.

FIG. 3 shows a third embodiment of the present invention in which the display 20 is pivoted to the keyboard 10 in such a way that when the display 20 is in the stowed position, the display screen is exposed and substantially flush with the upper face of the keyboard 10 thereby allowing user's observation.

In accordance with the present invention, a control circuit of the keyboard 10 also serves to receive and control video signal to be displayed on the display whereby a USB based keyboard is provided with a function of receiving video signals which may then be displayed on the display 20 thus making the keyboard versatile.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A keyboard assembly comprising:

a USB (Universal Serial Bus) based keyboard having an upper face on which push buttons are movably mounted, a recess being defined in the upper face of the keyboard; and a display received in the recess;

wherein the keyboard and the display are controlled by a common USB interface control circuit thereby enabling the keyboard to receive and display video signals.

2. The keyboard assembly as claimed in claim 1, wherein the display is completely received and fixed in the recess and is substantially flush with the upper face of the keyboard.

3. The keyboard assembly as claimed in claim 1, wherein the display is fixed at a pre-determined angle with respect to the upper face of the keyboard.

4. The keyboard assembly as claimed in claim 1, wherein the display is movable with respect to the keyboard between an erected position and a stowed position.

5. The keyboard assembly as claimed in claim 4, wherein the display is pivoted to the keyboard.

6. The keyboard assembly as claimed in claim 4, wherein the display is completely received in the recess when the display is at the stowed position.

7. The keyboard assembly as claimed in claim 6, wherein the display has a display screen which faces downward confronting a bottom of the recess when the display is at the stowed position.

8. The keyboard assembly as claimed in claim 6, wherein the display has a display screen which faces upwards and is thus exposed for user observation when the display is at the stowed position.

* * * * *